(12) United States Patent
Liu (10) Patent No.: US 7,518,598 B2
(45) Date of Patent: Apr. 14, 2009

(54) RETRACTION MECHANISM OF LIGHT PEN

(75) Inventor: Jung Tsan Liu, Taipei Hsien (TW)

(73) Assignee: HWA Ying Industrial Co., Ltd., Taipei Hsien (TW)

( * ) Notice: Subject to any disclaimer, the term of this patent is extended or adjusted under 35 U.S.C. 154(b) by 583 days.

(21) Appl. No.: 11/229,514

(22) Filed: Sep. 20, 2005

(65) Prior Publication Data

US 2007/0075987 A1  Apr. 5, 2007

(51) Int. Cl.
*G06F 3/033* (2006.01)

(52) U.S. Cl. .................................. 345/179; 345/156

(58) Field of Classification Search ............... 345/156, 345/179
See application file for complete search history.

(56) References Cited

U.S. PATENT DOCUMENTS 5,570,967 A * 11/1996 Chen ........................ 401/195
5,889,512 A *  3/1999 Moller et al. ............... 345/179
6,727,897 B1 *  4/2004 Mao-Sung ................. 345/179
2003/0067453 A1 *  4/2003 Liu et al. .................. 345/179

* cited by examiner

*Primary Examiner*—Amare Mengistu
*Assistant Examiner*—Premal Patel
(74) *Attorney, Agent, or Firm*—Bacon & Thomas, PLLC (57) ABSTRACT

Provided is a light pen comprising an elastic ejection assembly. In a retracting operation of the light pen, pressing a pushing rod into a barrel will move a pushing cylinder to compress a spring, push first teeth out of first grooves, clockwise turn the first teeth to move from the first groove to adjacent second groove, and cause a pilot bar to jump a pitch to completely conceal the light pen in a receptacle of an electronic device In an extending operation of the light pen, pressing the pushing rod again will clockwise turn the first teeth to move from the second groove to the adjacent first groove to cause the pilot bar to jump another pitch, and release a stored elastic force of the spring to push the pushing rod partially out of the receptacle.

2 Claims, 12 Drawing Sheets

RETRACTION MECHANISM OF LIGHT PEN

BACKGROUND OF THE INVENTION

1. Field of Invention

The present invention relates to light pens and more particularly to a retraction mechanism of light pen with improved characteristics.

2. Related Art

Figure 1:
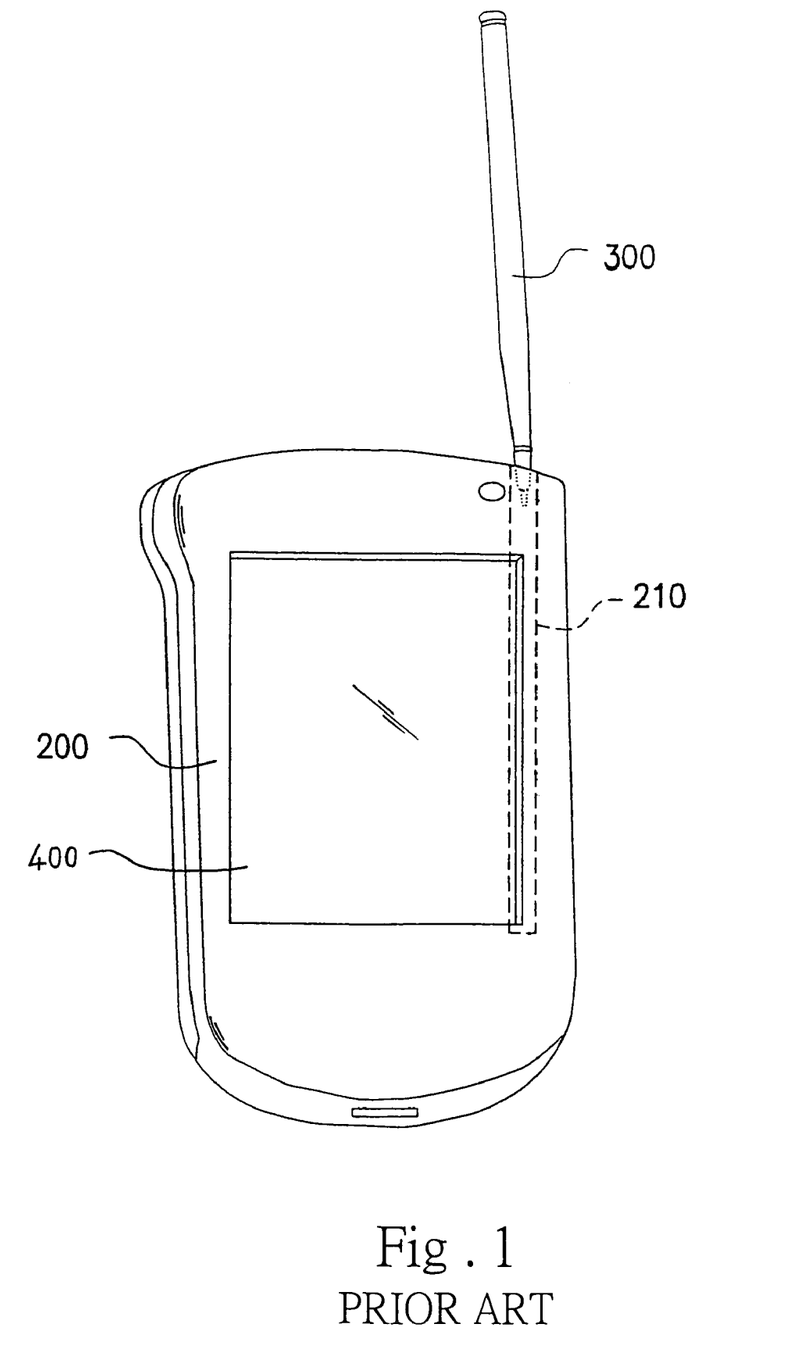
FIG. 1 is a top plan view of a conventional PDA having a mechanism for receiving a light pen.

A conventional PDA (personal digital assistant) 200 is shown in FIG. 1. A light pen 300 is adapted to touch an LCD (liquid crystal display) 400 in operation. Conventionally, a deep receptacle 210 is formed in the PDA 200 for receiving head of the light pen 300. Such arrangement is not desirable since the light pen 300 tends to disengage with the receptacle 210.

Figure 2:
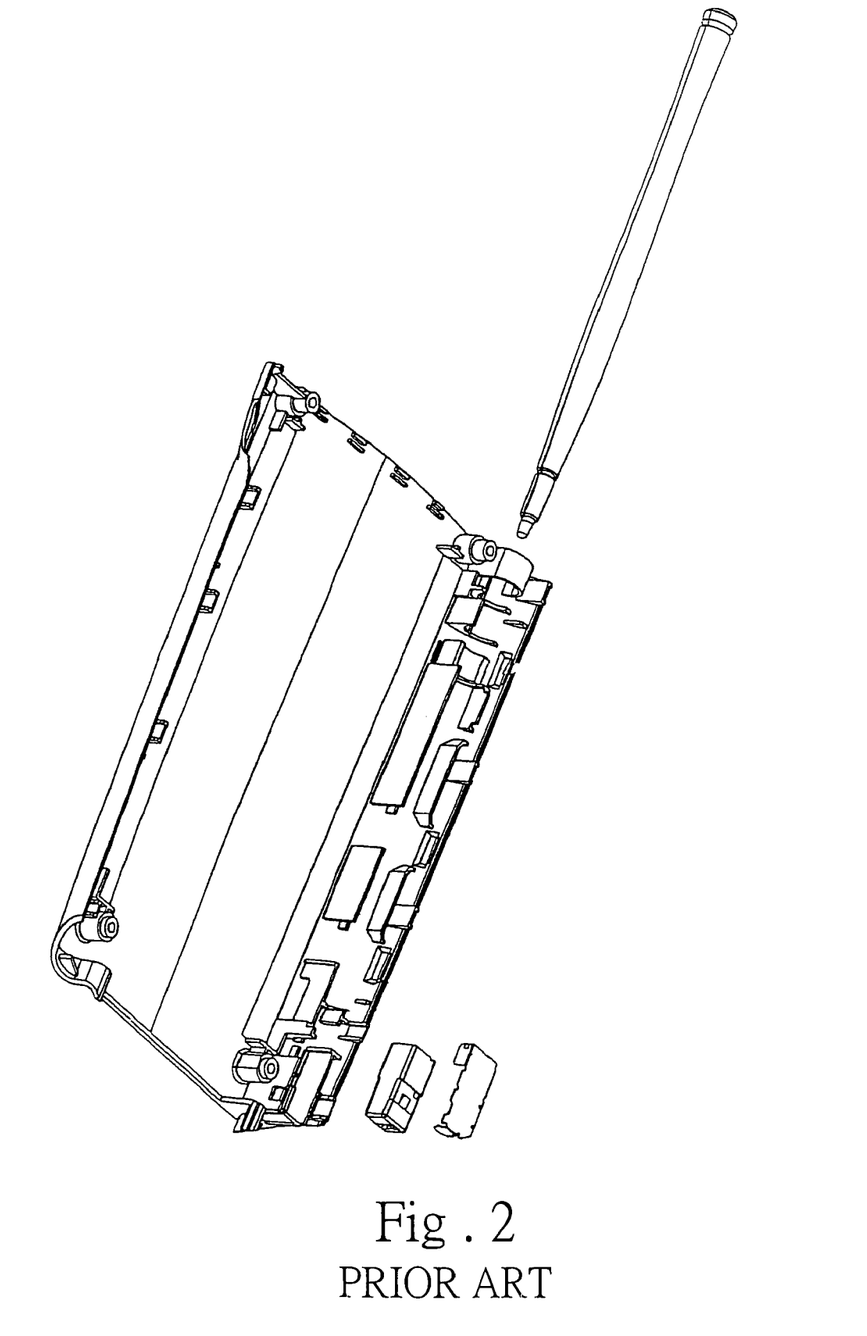
FIG. 2 is a perspective view of a disassembled component for showing a prior ejection mechanism for a light pen.

Another device having a prior ejection mechanism for a light pen is shown in FIG. 2. The mechanism is provided along one side of the device and comprises a deep receptacle for receiving a portion of the light pen, an elastic ejection device provided at bottom of the receptacle, the ejection device being adapted to be pressed by the head of the inserted light pen such that a further pressing of the light pen will release the stored elastic force of the ejection device to push the light pen out of the receptacle, an elastic locking device provided at one side proximate the bottom of the receptacle, a projecting member adapted to enter a groove proximate the head of the light pen, and a buffer member in the receptacle for engaging the light pen.

Figure 3:
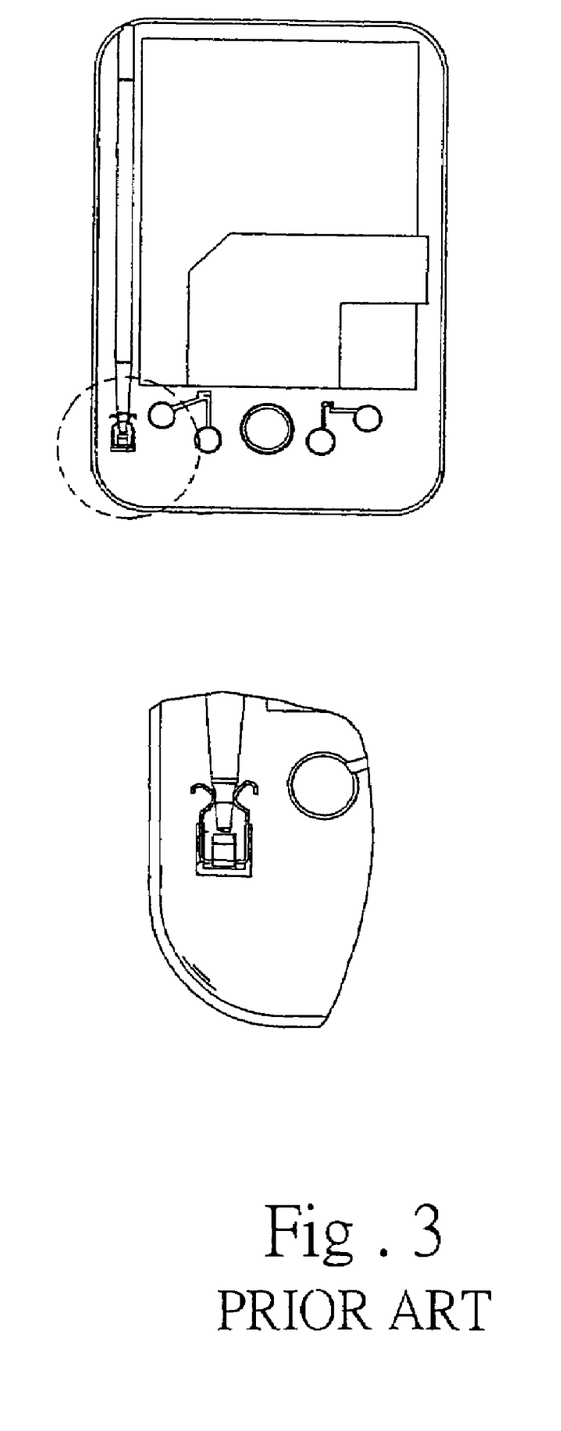
FIG. 3 is a perspective view of a device having a prior fixing and ejection mechanism for a light pen.
Figure 4:
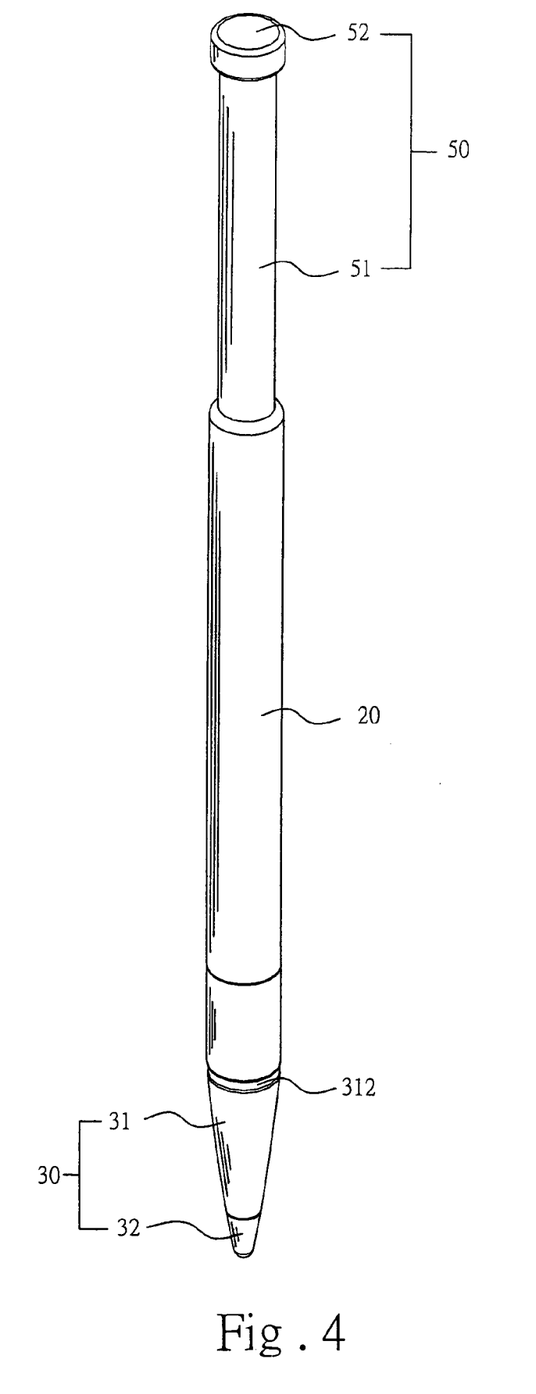
FIG. 4 is a perspective view of a preferred embodiment of light pen having an ejection mechanism according to the invention.

A further device having a prior fixing and ejection mechanism for a light pen is shown in FIG. 3. The mechanism is formed on a surface recess of the device and comprises a lower bag member and a pair of flexible upper arms extended therefrom. The head of a light pen is fastened by ends of the arms when the head of the light pen is inserted into the bag member.

However, the prior art suffered from a couple of disadvantages. For example, the ejection device may have an elastic fatigue problem after a relatively long period time of use. Further, the light pen may disengage with its receiving receptacle when a person touches the light pen unintentionally. Thus, the need for improvement still exists.

SUMMARY OF THE INVENTION

It is therefore an object of the present invention to provide a light pen comprising a barrel comprising internal threads at a lower portion; a writing head comprising a hollow nose including internal threads formed on an upper portion of its inner surface, and a cylindrical head; an elastic ejection assembly provided inside a lower portion of the barrel and an upper portion of the writing head and comprising an elongate pilot bar including annular first teeth, a first spring provided in the nose and biased between a bottom of the pilot bar and a shoulder of the head, a pushing cylinder including a plurality of second teeth around its lower portion, and a lower recess for receiving an upper extension of the pilot bar; and a hollow cylindrical member including lower external threads secured to both the internal threads of the writing head and the internal threads of the barrel, a plurality of longitudinal first grooves around its inner surface, and a plurality of longitudinal second grooves alternate with the first grooves; and a plunger comprising a lower hollow cylinder including inner threads around its inner surface, and at least one annular protruded seal proximate a bottom of the cylinder, and a pushing rod including an enlarged head and lower outer threads wherein the cylinder passes the barrel to cause the inner threads of the plunger to secure to the outer threads of the plunger, and the seal is stopped by an inwardly extending rim on a top of the barrel when the cylinder passes the barrel for preventing the cylinder from disengaging with the barrel; whereby in a retracting operation of the light pen, pressing the pushing rod into the barrel will move the pushing cylinder to compress the first spring, push the first teeth out of the first grooves, clockwise turn the first teeth to move from the first groove to the adjacent second groove, and cause the pilot bar to jump a pitch to completely conceal the light pen in a receptacle of an electronic device; and in an extending operation of the light pen, pressing the pushing rod again will clockwise turn the first teeth to move from the second groove to the adjacent first groove to cause the pilot bar to jump another pitch, and release a stored elastic force of the first spring to push the pushing rod partially out of the receptacle.

The above and other objects, features and advantages of the present invention will become apparent from the following detailed description taken with the accompanying drawings.

DETAILED DESCRIPTION OF THE INVENTION

Referring to FIGS. 4 to 12, a light pen having an ejection mechanism in accordance with a preferred embodiment of the invention is shown. The light pen comprises a writing head 30, a barrel 20, an elastic ejection assembly 40, and a plunger 50. Each component is discussed in detailed below.

The barrel 20 comprises internal threads 21 at a lower portion. The writing head 30 comprises a nose 31 including an axial bore 311, internal threads 313 formed on an upper portion of its inner surface, and an annular groove 312 at a joining portion of its hollow, cylindrical upper portion and its conic lower portion; and a cylindrical head 32. The elastic ejection assembly 40 is provided inside a lower portion of the barrel 20 and an upper portion of the writing head 30 and comprises an elongate pilot bar 41 including a tooth section 411 therearound, the tooth section 411 having three teeth 412 equally spaced therearound; a spring 44 provided in the bore 311 and biased between a bottom of the pilot bar 41 and a shoulder of the head 32; a pushing cylinder 42 including a plurality of teeth 421 around its lower portion, and a lower recess for receiving an upper extension of the pilot bar 41; and a hollow cylindrical member 43 including external threads 433 proximate its lower portion, the external threads 433 being threadedly secured to both the internal threads 313 and the internal threads 21, a plurality of longitudinal first grooves 431 around its inner surface, and a plurality of longitudinal second grooves 432 alternate with the first grooves 431. The teeth 421 are adapted to matingly engage with a top of the tooth section 411 or not for stepwise moving from the first groove 431 to the second groove 432 around a top of the teeth 412. The elastic ejection assembly 40 further comprises a spring 45 provided in an upper portion of the inner surface of the cylindrical member 43, and a ring 46 tightly put on the external threads 433.

Figure 5:
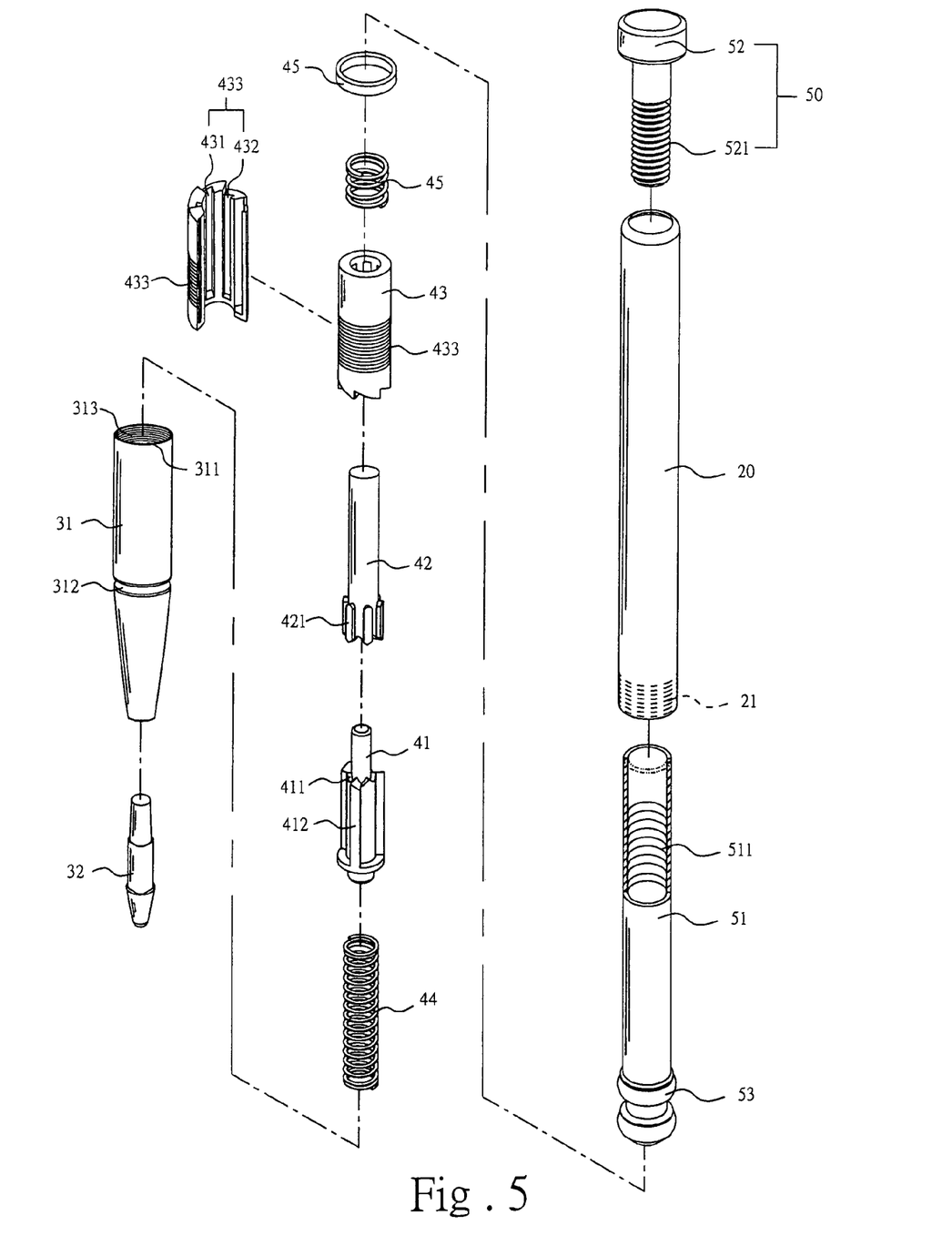
FIG. 5 is an exploded view of the light pen of FIG. 4.
Figure 6:
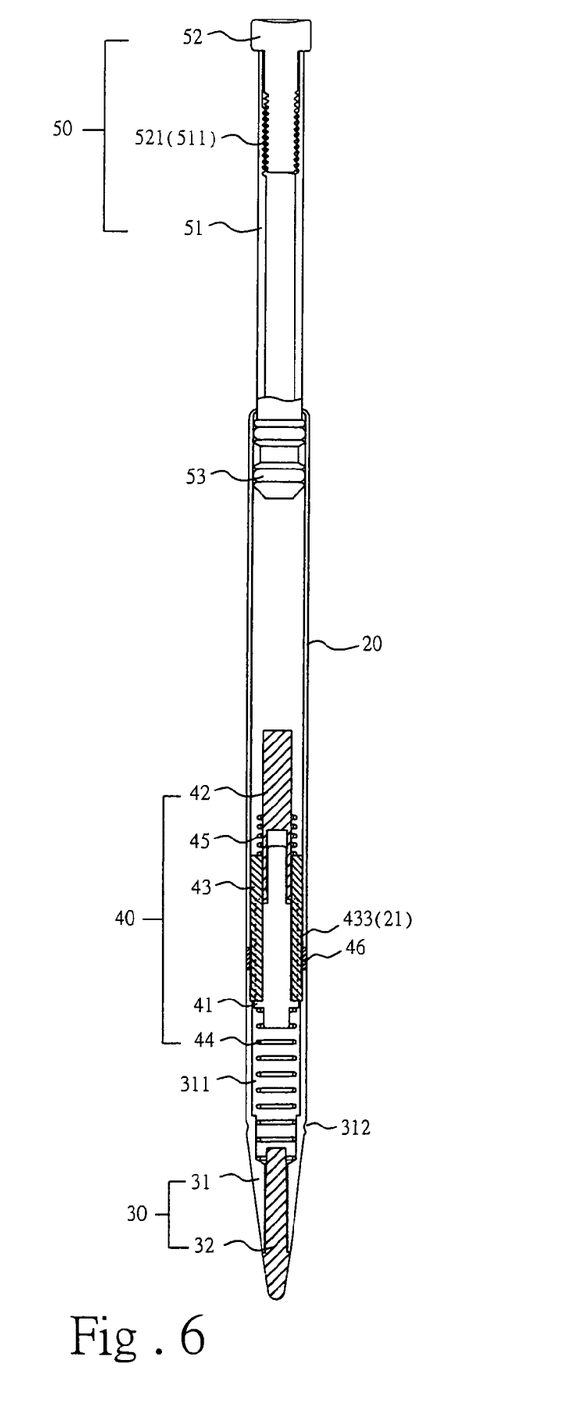
FIG. 6 is a longitudinal sectional view of FIG. 4 where the plunger is fully extended.
Figure 7:
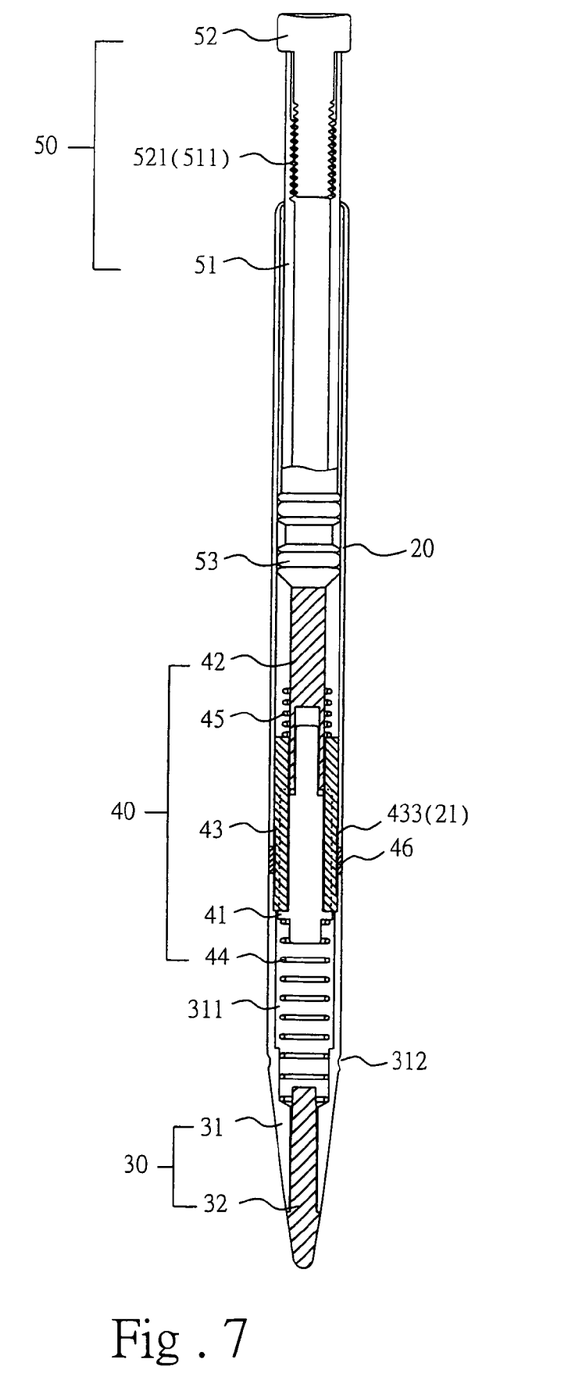
FIG. 7 is a view similar to FIG. 6 where the plunger is partially retracted.
Figure 8:
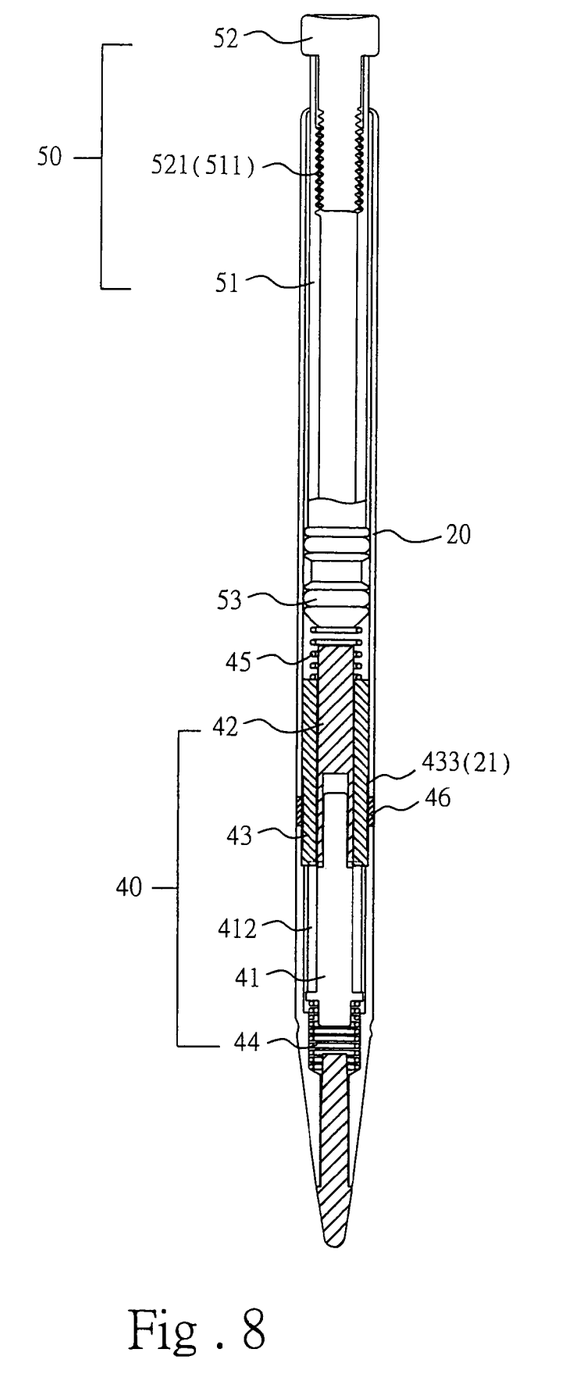
FIG. 8 is a view similar to FIG. 6 where the plunger is fully retracted.
Figure 9:
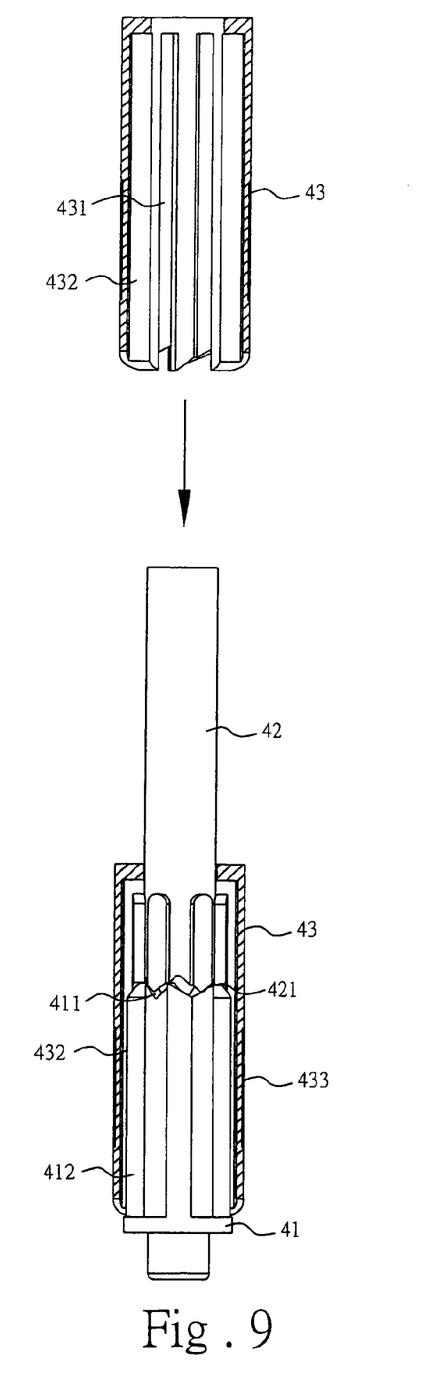
FIG. 9 is a longitudinal sectional view of a portion of the light pen showing the elastic ejection assembly after the plunger has fully extended.
Figure 10:
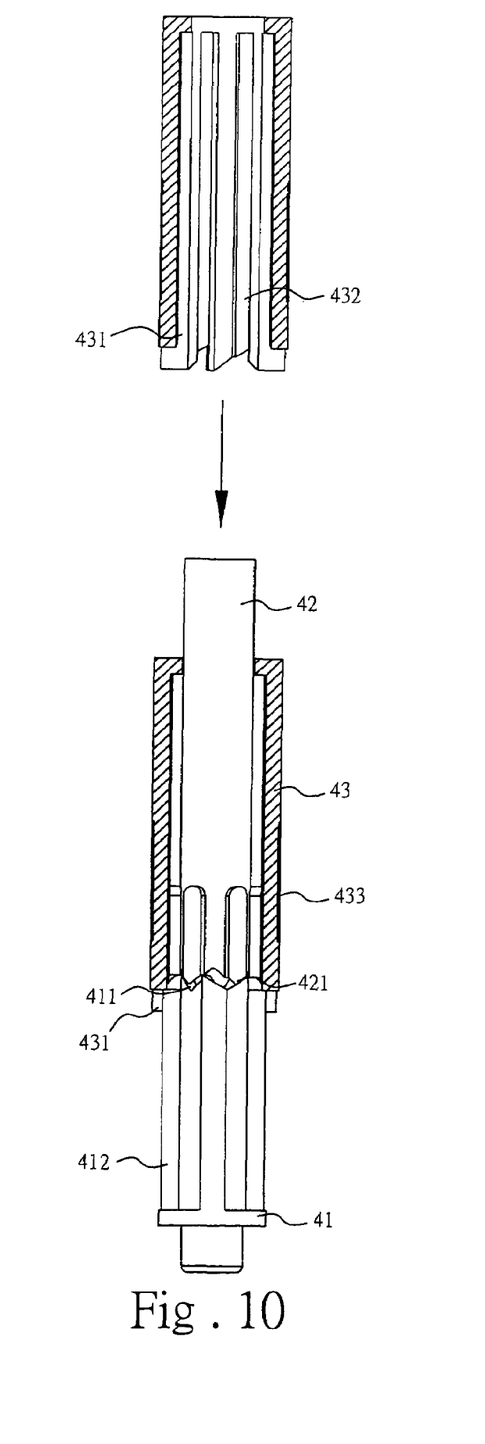
FIG. 10 is a view similar to FIG. 9 showing the elastic ejection assembly after the plunger has fully retracted.

The plunger 50 comprises a lower hollow cylinder 51 including inner threads 511 around its inner surface, and two annular protruded seals 53 proximate bottom of the cylinder 51; and a pushing rod 52 including an enlarged head and outer threads 521 around its lower portion. The cylinder 51 passes the barrel 20 to cause the inner threads 511 to secure to the outer threads 521. The upper seal 53 is stopped by an inwardly extending rim on a top of the barrel 20 when the cylinder 51 passes the barrel 20. As such, the cylinder 51 is prevented from disengaging with the barrel 20. The seals 53 can make an extending or retracting operation of the light pen more stable.

Figure 11:
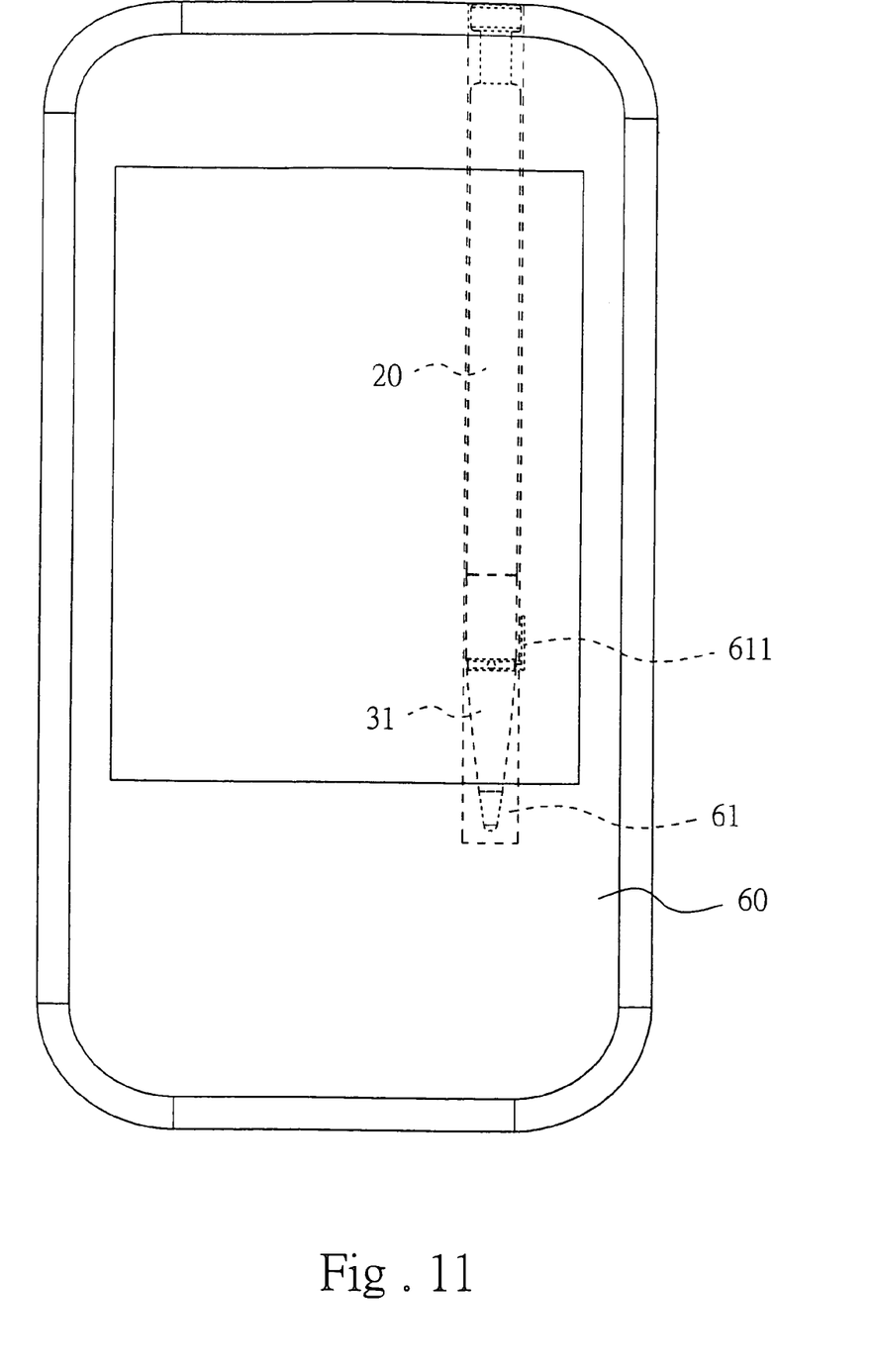
FIGS. 11 and 12 are top plan views of a PDA incorporating the light pen of the invention where the light pen is disposed in retracted and extended positions respectively.
Figure 12:
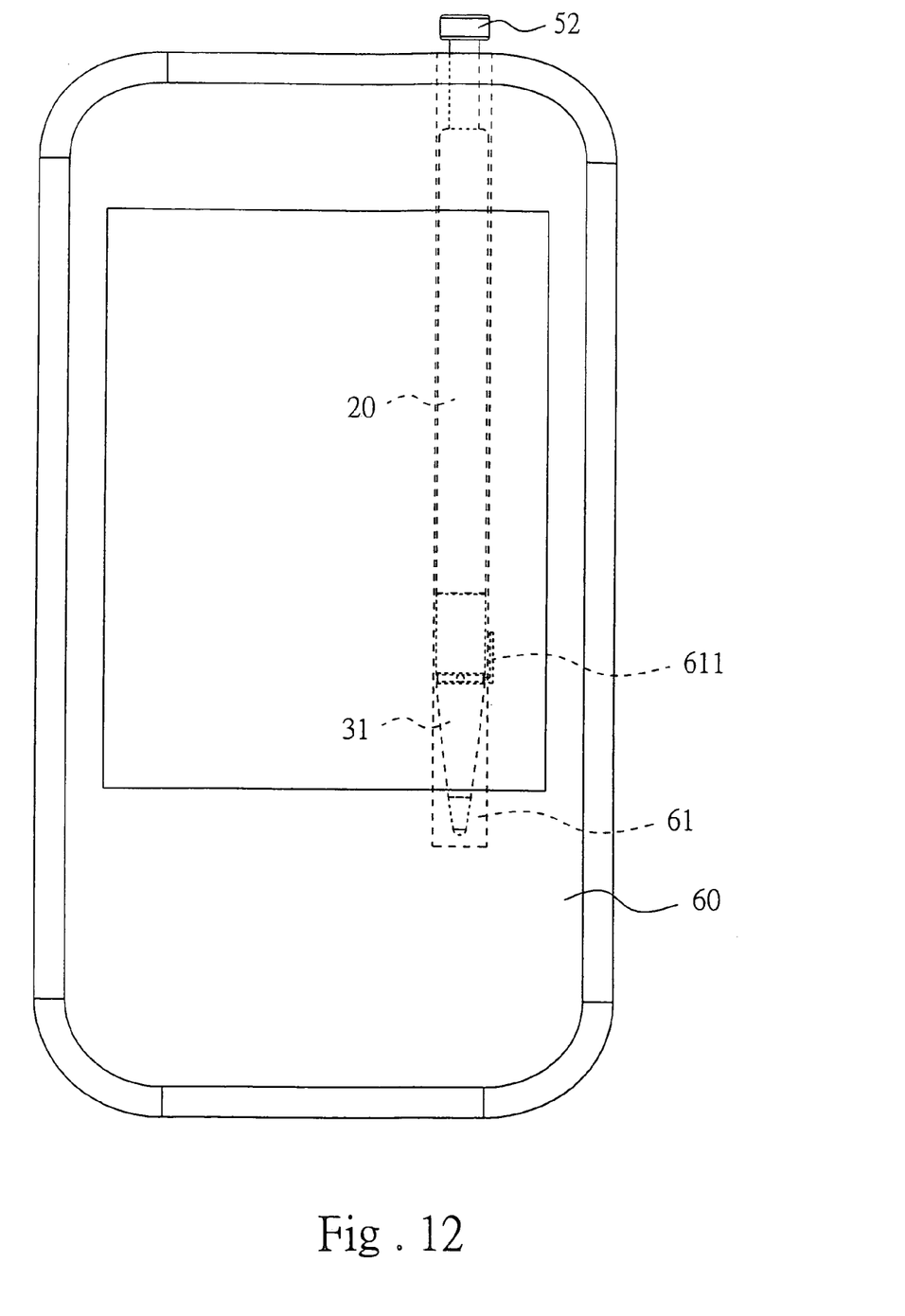

By configuring as above, the light pen may conceal in a deep receptacle 61 of a PDA 60 in which the light pen can completely conceal in the deep receptacle 61 by activating the elastic ejection assembly 40. For removing the light pen, simply pressing the pushing rod 52 is sufficient.

Referring to FIGS. 6 to 10 again, an operation of activating the elastic ejection assembly 40 by pressing the plunger 50 is detailed below. The plunger 50 is extended from the barrel 20. The teeth 421 are adapted to matingly engage with the top of the tooth section 411 or not for stepwise moving from the first groove 431 to the second groove 432 around the top of the teeth 412. For retracting the light pen, push the plunger 50 into the barrel 20 with a top of the pushing cylinder 42 retracted inside the barrel 20. Also, the pushing cylinder 42 moves to compress the spring 44 and in turn the teeth 412 are pushed out of the first grooves 431. At the same time, the teeth 421 move along the teeth 411 to a position not in complete tooth engagement therewith. That is, the teeth 412 clockwise turn from the first groove 431 to the second groove 432 for causing the pilot bar 41 to jump a pitch. Thus, the pilot bar 41 is prohibited from moving upward (see FIGS. 8 and 9). As an end, the light pen is completely concealed in the deep receptacle 61 of the PDA 60 (see FIG. 11). For extending the light pen for use, simply press the pushing rod 52 again to cause the teeth 412 to clockwise turn from the second groove 432 to the first groove 431 to cause the pilot bar 41 to jump another pitch. The stored elastic force of the spring 44 is thus released to push the pushing rod 52 partially out of the deep receptacle 61 of the PDA 60, i.e., the light pen being ready to use.

Note that in another embodiment the cylindrical member 43 may form integrally with the inner surface of the barrel 20 for decreasing the number of components. Also, the spring 45 is adapted to prevent the cylinder 51 retracted inside the barrel 20 from engaging the pushing cylinder 42. Such can facilitate the ejecting operation of the elastic ejection assembly 40. Most importantly, touching the light pen unintentionally will not eject the light pen out of the deep receptacle 61. Thus, the invention is more reliable in use.

While the invention herein disclosed has been described by means of specific embodiments, numerous modifications and variations could be made thereto by those skilled in the art without departing from the scope and spirit of the invention set forth in the claims.

What is claimed is:

1. A light pen comprising:
a barrel comprising internal threads at a lower portion and an inwardly extending rim at a top end;
a writing head comprising a hollow nose including internal threads formed on an upper portion of its inner surface, and a cylindrical head;
an elastic ejection assembly disposed inside a lower portion of the barrel and an upper portion of the writing head and comprising an elongate pilot bar including annular first teeth, a first resilient member disposed in the nose and biased between a bottom of the pilot bar and a shoulder of the head, a pushing cylinder including a plurality of second teeth around its lower portion, and a lower recess for receiving an upper extension of the pilot bar; and a hollow cylindrical member including lower external threads secured to both the internal threads of the writing head and the internal threads of the barrel, a plurality of longitudinal first grooves around its inner surface, and a plurality of longitudinal second grooves alternate with the first grooves; and
a plunger comprising a lower hollow cylinder including at least one annular protruded seal proximate a bottom of the cylinder, and a pushing rod including an enlarged head;
wherein the pushing rod is threadably engaged with the lower hollow cylinder, the at least one annular protruded seal is slidably disposed within the barrel, and the enlarged head of the pushing rod is disposed outside of the barrel and above the inwardly extending rim such that the plunger is movable between an extended position wherein the plunger is stopped from further movement outward from the barrel by the annular protruded seal contacting the rim, and a retracted position;
wherein in a retracting operation of the light pen, pressing the pushing rod into the barrel will move the pushing cylinder to compress the first resilient member, push the first teeth out of the first grooves, clockwise turn the first teeth to move from the first groove to the adjacent second groove, and cause the pilot bar to jump a pitch to completely conceal the light pen in a receptacle of an electronic device in said retracted position; and
in an extending operation of the light pen, when said plunger is in said retracted position, pressing the pushing rod will clockwise turn the first teeth to move from the second groove to the adjacent first groove to cause the pilot bar to jump another pitch, and release a stored elastic force of the first resilient member to push the pushing rod partially out of the receptacle whereby said pushing rod is readily graspable to be pulled into said extended position.

2. The light pen of claim 1, wherein the elastic ejection assembly further comprising a second resilient member disposed in an upper portion of the inner surface of the cylindrical member, and wherein the second resilient member is adapted to prevent the cylinder retracted inside the barrel from engaging the pushing cylinder in the retracting operation of the light pen.

* * * * *